(12) United States Patent
Handa (10) Patent No.: US 7,957,519 B2
(45) Date of Patent: *Jun. 7, 2011

(54) PRIVATE BRANCH EXCHANGE SYSTEM AND METHOD FOR CONTROL THEREOF

(75) Inventor: Tomohisa Handa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 303 days.

This patent is subject to a terminal disclaimer.

(21) Appl. No.: 12/268,106

(22) Filed: Nov. 10, 2008

(65) Prior Publication Data

US 2009/0067609 A1    Mar. 12, 2009

Related U.S. Application Data

(63) Continuation of application No. 10/799,670, filed on Mar. 15, 2004, now Pat. No. 7,463,728.

(30) Foreign Application Priority Data

Mar. 14, 2003    (JP) .................................. 2003-069994

(51) Int. Cl.
*H04M 7/00*    (2006.01)
*H04M 1/56*    (2006.01)
*H04M 15/06*    (2006.01)

(52) U.S. Cl. .................... 379/234; 379/142.06; 379/232

(58) Field of Classification Search ............ 379/142.01, 379/142.04, 142.06, 142.07, 142.15, 198, 379/231–234

See application file for complete search history.

(56) References Cited

U.S. PATENT DOCUMENTS

| | | | |
|---|---|---|---|
| 5,268,958 A | 12/1993 | Nakano | |
| 5,515,422 A | 5/1996 | MeLampy | |
| 5,546,447 A | 8/1996 | Skarbo | |
| 6,324,263 B1 * | 11/2001 | Sherwood et al. | ......... 379/88.19 |
| 6,434,226 B1 * | 8/2002 | Takahashi | ................ 379/201.01 |
| 6,542,584 B1 * | 4/2003 | Sherwood et al. | ......... 379/88.18 |
| 6,546,083 B1 | 4/2003 | Chaves | |
| 2002/0064275 A1 | 5/2002 | Tatsumi | |
| 2003/0097466 A1 * | 5/2003 | Sung | ............................ 709/238 |
| 2005/0174990 A1 | 8/2005 | Riemann | |

FOREIGN PATENT DOCUMENTS

| | | |
|---|---|---|
| CN | 1354591 | 6/2002 |
| EP | 1209925 | 5/2002 |
| JP | 5244286 | 9/1993 |

OTHER PUBLICATIONS

Chinese Office Action dated Oct. 17, 2008 with English translation.

* cited by examiner

*Primary Examiner* — Binh K Tieu
(74) *Attorney, Agent, or Firm* — Dickinson Wright PLLC (57) ABSTRACT

It is one objective of the present invention to provide a private branch exchange that can identify calls to be routed to an extension phone group.

A private branch exchange according to this invention comprises: a caller information detector for, when a call is received, obtaining caller information; a group incoming call table in which two or more extension numbers are correlated with an extension incoming call group number; and an incoming call group controller for, when a call received through the telephone line is for an extension incoming call group number, extracting from the group incoming call table extension numbers that are correlated with the extension incoming call group number and transmitting an incoming call signal to extension phones corresponding to the extension numbers, and also for storing, in a group incoming call log table, a caller number that is obtained by the caller information detector.

6 Claims, 11 Drawing Sheets

| OUTSIDE LINE NO. | DESTINATION TELEPHONE NUMBER |
|---|---|
| ANALOG 01 | TEL01, TEL02, TEL03 |
| ANALOG 02 | GROUP 01 |
| DIGITAL 01 | GROUP 02, GROUP 03 |
| DIGITAL 02 | TEL04 |

FIG. 4(b)

| CALLER NO. | DESTINATION TELEPHONE NUMBER |
|---|---|
| 123-45×× | GROUP 02, 03 |
| 234-56△△ | GROUP 01 |
| 922-22◇◇ | TEL04, TEL05 |
| 352-97○○ | TEL07, TEL08, TEL09 |

FIG. 5

| GROUP NUMBER | DESTINATION TELEPHONE NUMBER |
|---|---|
| 01 | TEL01, TEL02, TEL03 |
| 02 | TEL03, TEL04, TEL05 |
| 03 | TEL06, TEL07, TEL08, TEL09, TEL10 |
| 04 | |
| 05 | |
| 06 | |
| 07 | |
| 08 | |
| 09 | |
| 10 | TEL11, TEL12 |

FIG. 6

| GROUP NUMBER | INCOMING CALL LOG INFORMATION | REFERENCE |
|---|---|---|
| 01 | 12345 ○○ | NO |
| 01 | 06123456 △△ | YES |
| 01 | 0081123456 ×× | YES |
| 03 | 031234567 ◇◇ | NO |
| 02 | 004112345678 △× | NO |
| 10 | 331234567 ○△ | YES |
| | | |
| | | |
| | | |
| | | |

FIG. 7

EXTENSION NUMBER 02

| KEY NUMBER | FUNCTION CONTENTS |
|---|---|
| 01 (a) | GROUP 01 |
| 02 (b) | GROUP 03 |
| 03 (c) | — |
| 04 (d) | — |
| 05 (e) | — |
| 06 (f) | — |
| 07 (g) | — |
| 08 (h) | — |
| 09 (i) | — |
| 10 (j) | — |

FIG. 8

| CALL RECEPTION TIME | CALLER NUMBER | ANSWERING STATE | ANSWERING TEL | REFERENCE TEL | REPLYING TEL |
|---|---|---|---|---|---|
| 3/1 AM 8:22 | CO:123-345○○ | ANSWERED | EXT:101 | --- | --- |
| 3/1 AM 9:45 | CO:06-123-456△△ | NOT ANSWERED | --- | EXT:104 | --- |
| 3/1 AM 9:45 | CO:0081-1234-56×× | NOT ANSWERED | --- | EXT:102 | EXT:102 |

PRIVATE BRANCH EXCHANGE SYSTEM AND METHOD FOR CONTROL THEREOF

This is a continuation application of application Ser. No. 10/799,670 filed Mar. 15, 2004 (pending) which is based on and claims priority of Japanese Application Number 2003-069,594 filed Mar. 14, 2003.

BACKGROUND OF THE INVENTION

1. Field of the Invention

The present invention relates to a private branch exchange that can connect a plurality of extension phones, and relates particularly to a private branch exchange that can refer to a log of incoming calls.

2. Description of the Related Art

A private branch exchange has been proposed that stores a log of incoming calls for an extension phone, and displays this log on the display means of the extension phone by operating the extension phone (see JP-A-5-244286) This function is extremely convenient because the user of the extension phone can easily identify callers and the times calls were received while the user was absent.

Although a conventional private branch exchange can display a log of incoming calls for each extension phone, and can assign a plurality of extension phones to a single extension group and route incoming calls to this group, incoming calls are separately registered in logs maintained for individual extension phones. Therefore, it can not be determined whether an incoming call was routed to a group or to a specific extension phone provided for an individual user. When a plurality of persons work as operators and constitute an incoming call group, a predetermined call distribution system, such as a UCD or an ACD, sorts incoming calls and routes them to this group. However, when a specific operator does not know that a call routed to a specific extension phone was answered, or when the specific operator knows that the call was answered but does not know who the call was from, the specific operator must move to the phone whereat the call was received and examine the incoming call log for that phone.

SUMMARY OF THE INVENTION

To resolve these shortcomings, it is one objective of the present invention to provide a private branch exchange that can identify calls to be routed to an extension phone group and can easily maintain an incoming call log for the extension phone group.

To achieve this objective, according to the invention, a private branch exchange that can coordinate and manage connections for a plurality of extension phones comprises:

a caller information detector for, when a call is received without a telephone line, obtaining caller information;

a group incoming call table in which at least two extension numbers are correlated with an extension incoming call group number; and a controller for, when a call received along the telephone line is for an extension incoming call group number, extracting from the group incoming call table extension numbers that are correlated with the extension incoming call group number and transmitting an incoming call signal to extension phones corresponding to the extension numbers, and also for storing, in a group incoming call log storage unit, a caller number that is obtained by the caller information detector.

With this configuration of the private branch exchange, the log of incoming calls addressing the extension group can be identified, and can easily be employed.

DESCRIPTION OF THE PREFERRED EMBODIMENTS

The preferred embodiments of this invention will now be explained while referring to the accompanying drawings.

Figure 1:
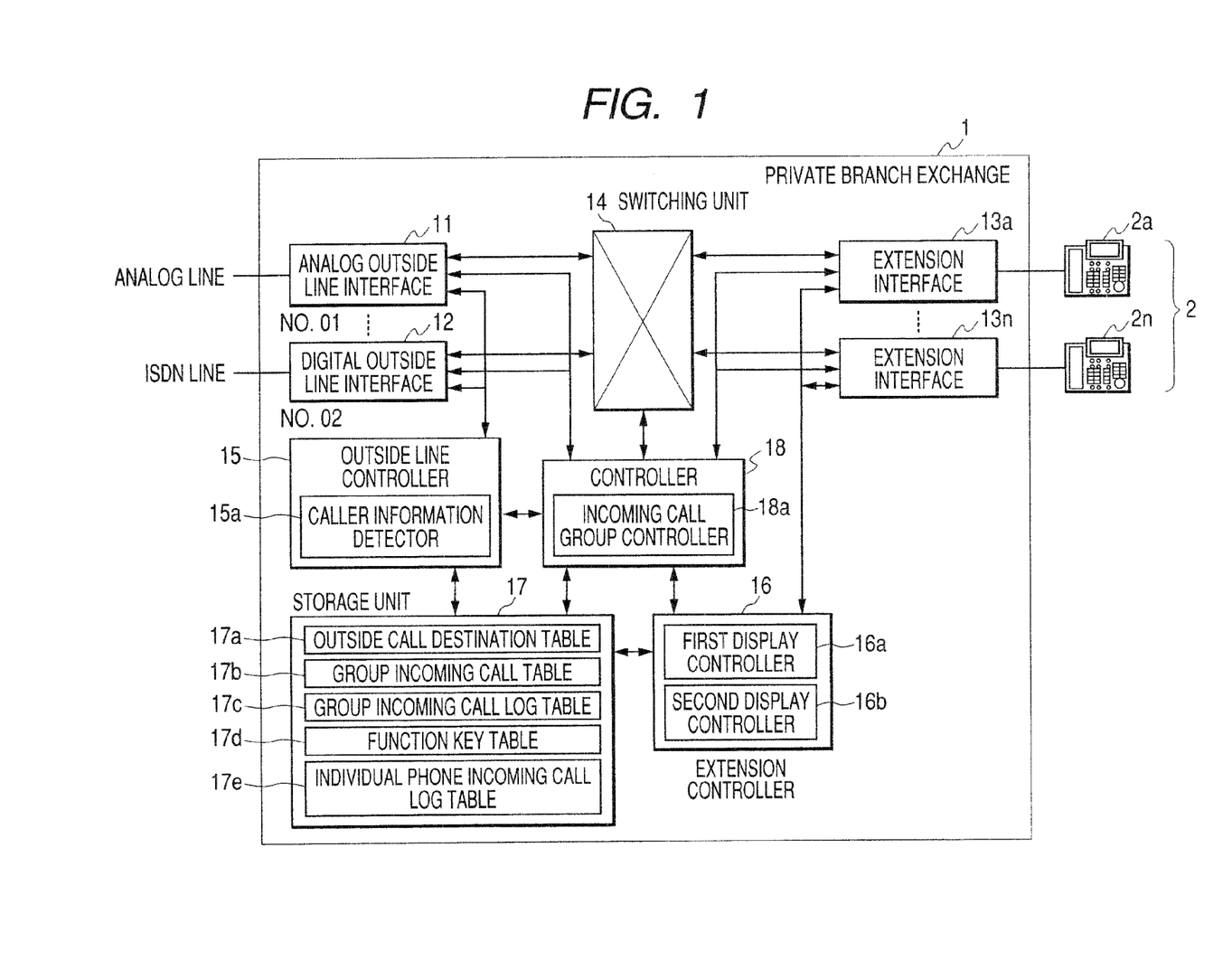
FIG. 1 is a diagram showing the configuration of a private branch exchange according to one embodiment of the present invention.
Figure 2:
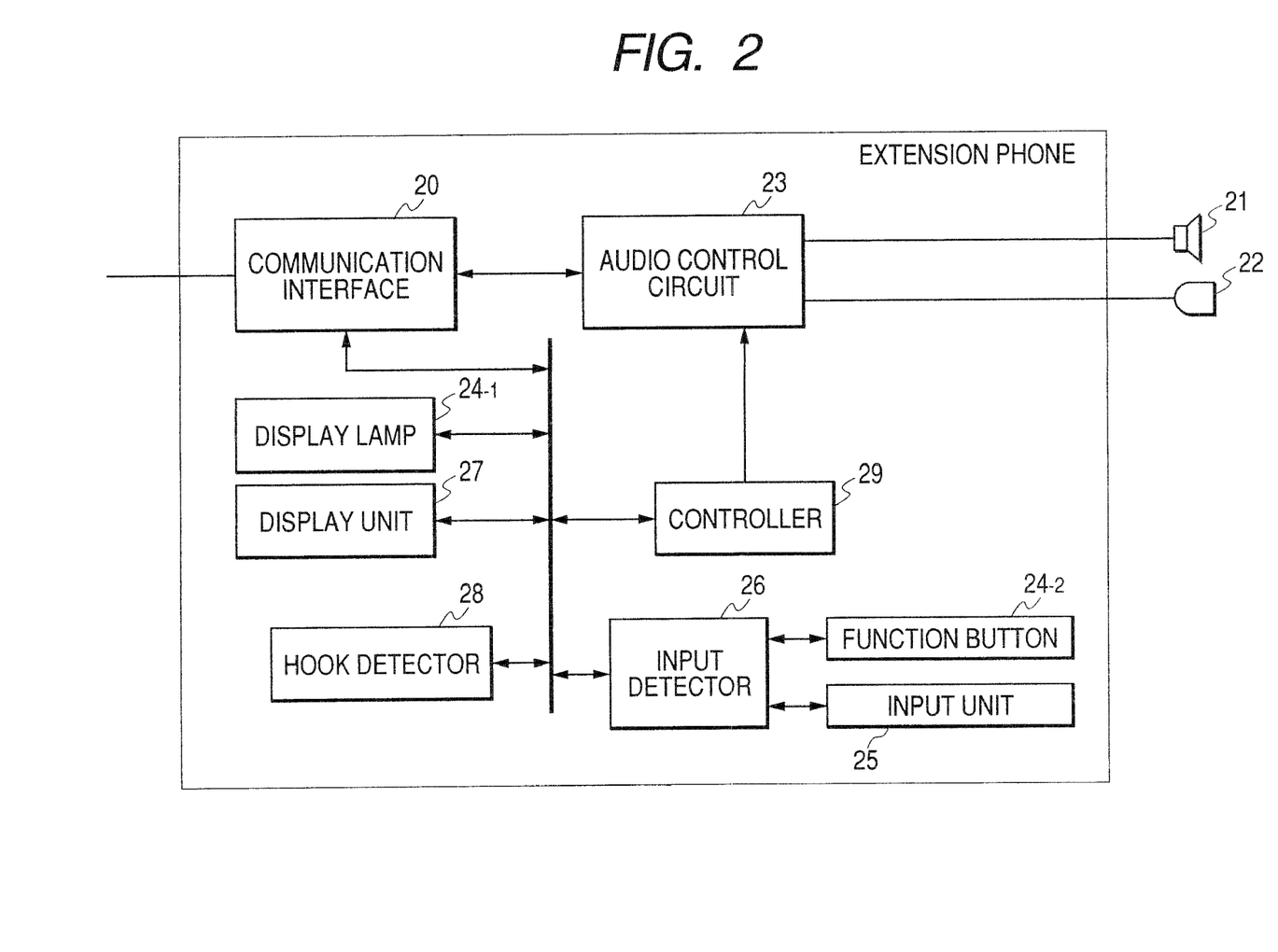
FIG. 2 is a diagram showing the internal configuration of an extension phone according to the embodiment of the invention.
Figure 3:
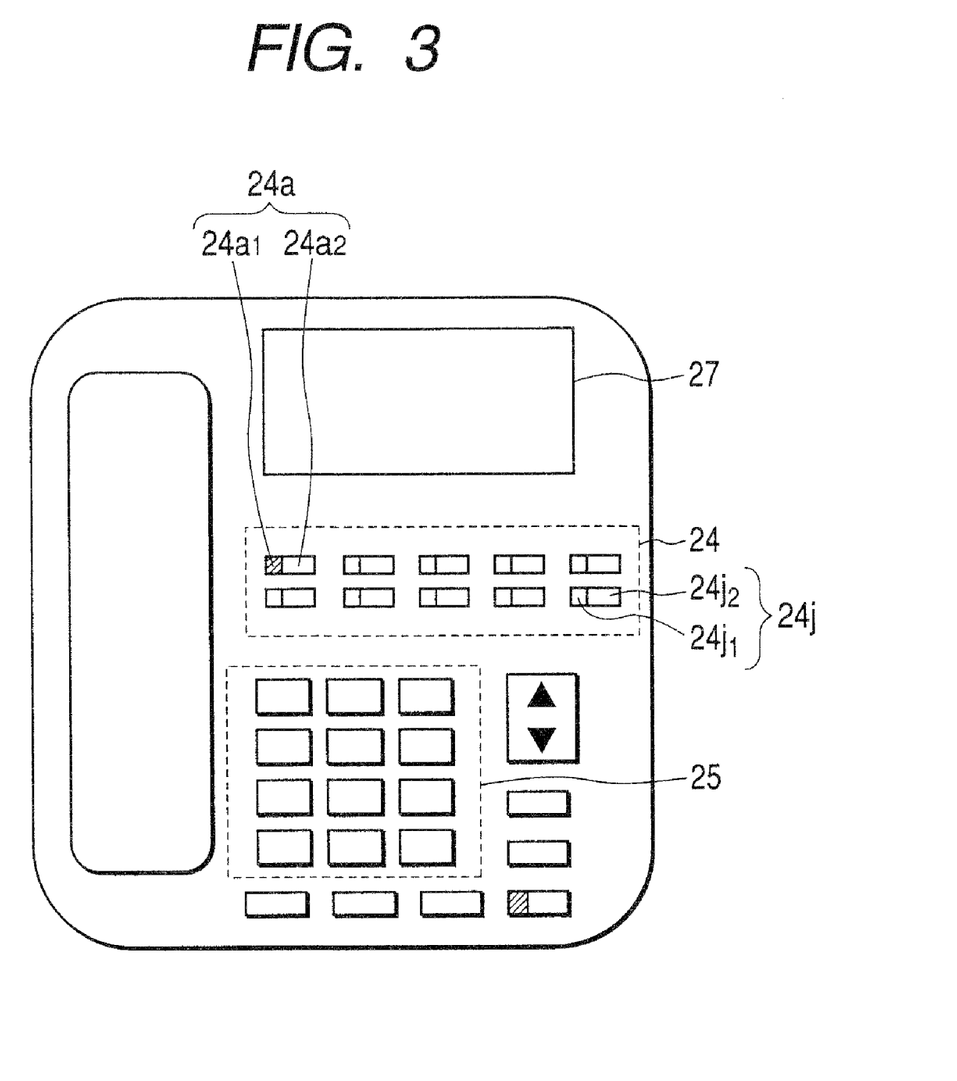
FIG. 3 is a diagram showing the external appearance of the extension phone according to the embodiment of the invention.
Figure 4A:
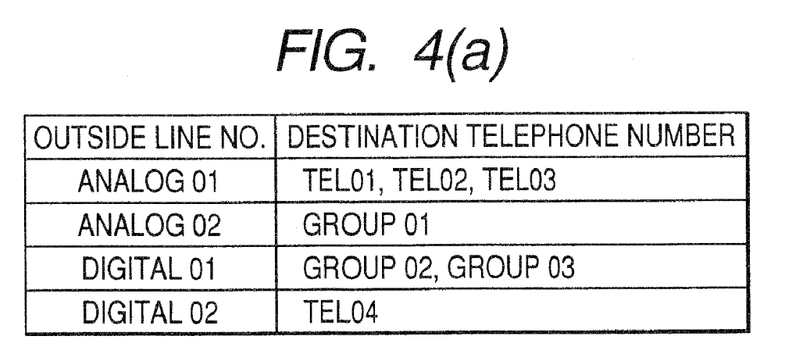
FIG. 4A is a first outside call destination table according to the embodiment.
Figure 4B:
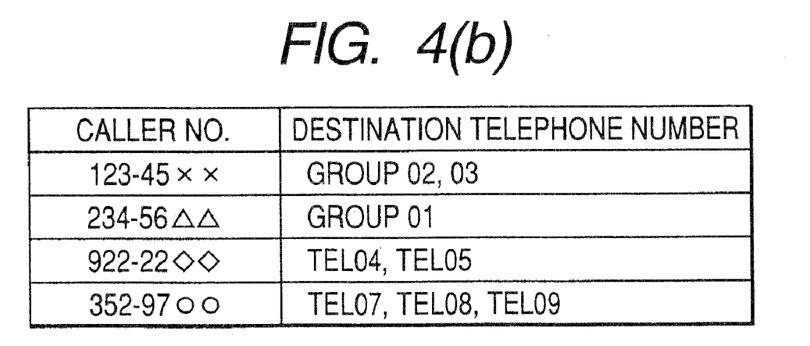
FIG. 4B is a second outside call destination table according to the embodiment.
Figure 5:
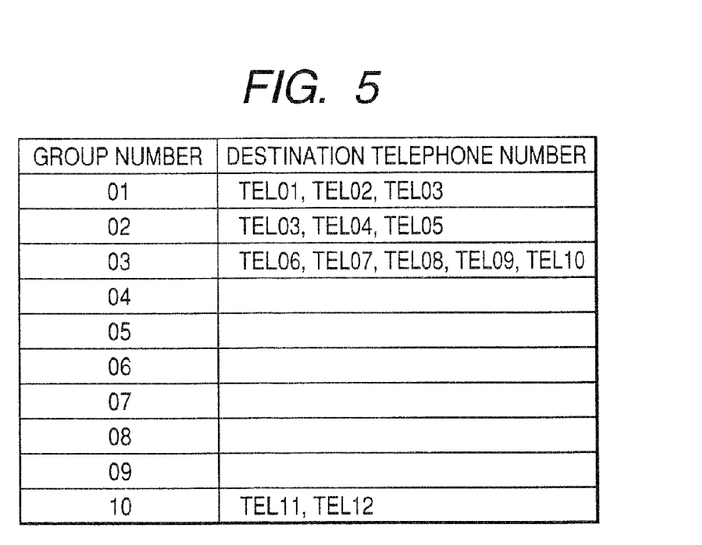
FIG. 5 is a group incoming call table according to the embodiment of the invention.
Figure 6:
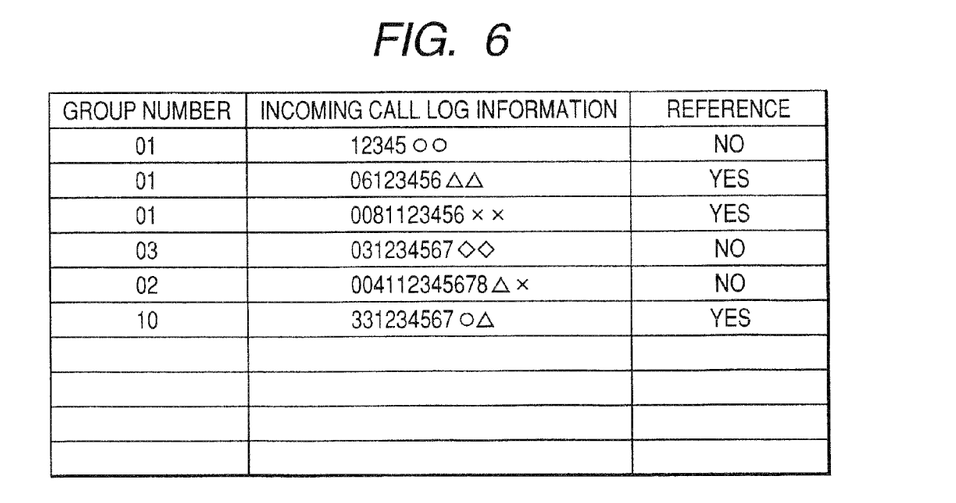
FIG. 6 is a group incoming call log table according to the embodiment of the invention.
Figure 7:
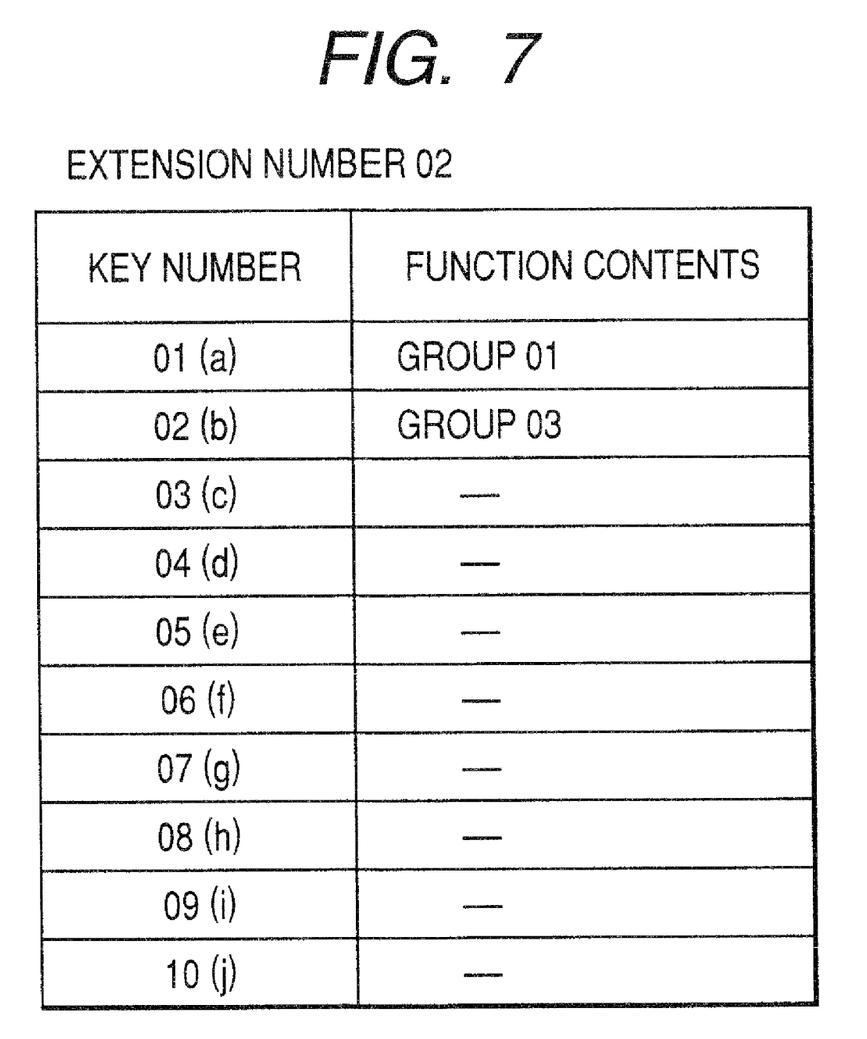
FIG. 7 is a diagram showing the contents of a function key table for the extension phone according to the embodiment of the invention.
Figure 8:
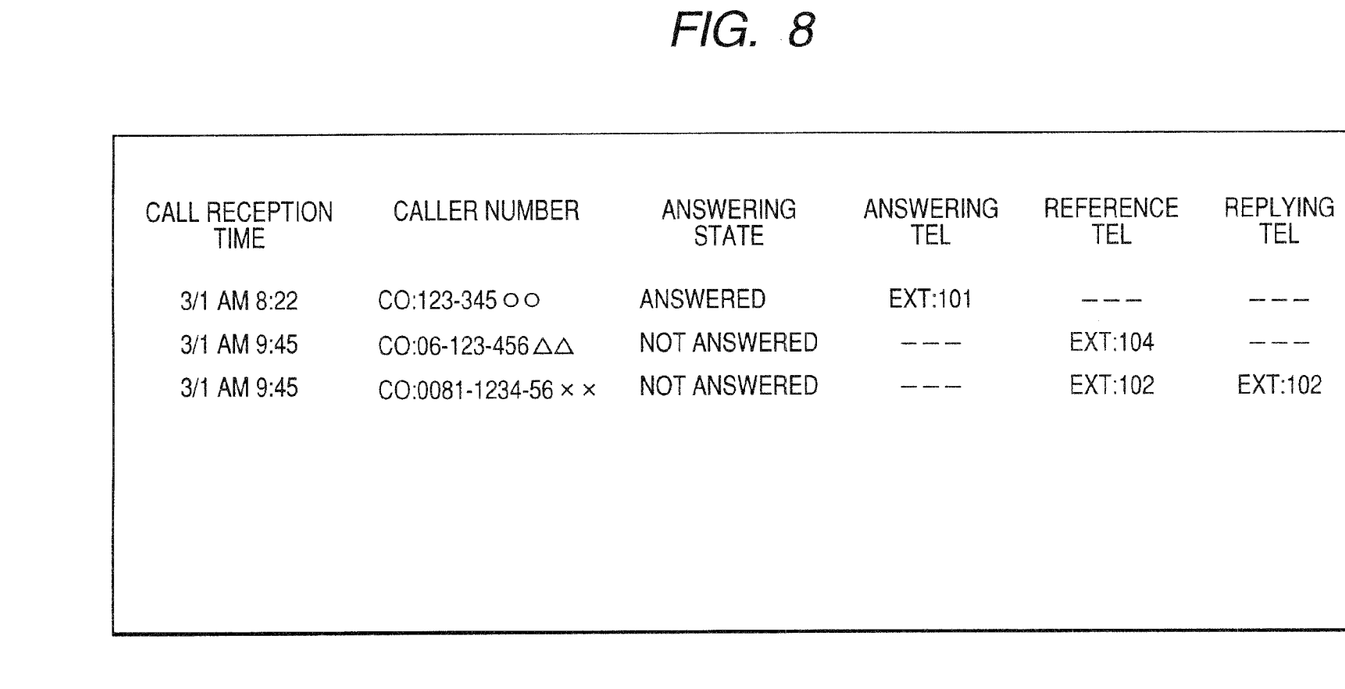
FIG. 8 is a diagram showing the contents of a group incoming call log displayed on the extension phone according to the embodiment of the invention.

FIG. 1 is a diagram showing the configuration of a private branch exchange according to one embodiment of the present invention. FIG. 2 is a diagram showing the internal configuration of an extension phone according to the embodiment of the invention. FIG. 3 is a diagram showing the external appearance of the extension phone according to the embodiment of the invention. FIG. 4A is a first outside call destination table according to the embodiment of the invention, and FIG. 4B is a second outside call destination table according to the embodiment of the invention. FIG. 5 is a group incoming call table according to the embodiment of the invention, and FIG. 6 is a group incoming call log table according to the embodiment of the invention. FIG. 7 is a diagram showing the contents of a function key table for extension phones according to the embodiment of the invention. And FIG. 8 is a diagram showing the contents of a group incoming call log displayed on the extension phone according to the embodiment of the invention.

In FIG. 1 are shown a private branch exchange 1 and extension phones 2 (2a to 2n). Extension phone 2 is a general term employed for the extension phones 2a to 2n. An analog outside line interface 11 is used to connect to an analog telephone line and to perform communication. A digital outside line interface 12 is used to connect to a digital telephone line and to perform communication. Extension interfaces 13a to 13n are used to connect to the extension phones 2. A switching unit 14 is used to facilitate, or to halt, the transmission of audio signals between the analog outside line interface 11, or the digital outside line interface 12, and the extension interfaces 13.

An outside line controller 15 controls the transmission of signals from the analog outside line interface 11 or the digital outside line interface 12 to the telephone line. Further, when a call has arrived along the telephone line to the analog outside line interface 11 or to the digital outside line interface 12, the outside line controller 15 extracts, from an outside call destination table 17a, which will be described later, the extension number or the extension incoming call group number for the destination extension phone 2, and transmits the extracted number to a controller 18, which will be described later. The outside line controller 15 includes a caller information detector 15a, and upon the reception, along a telephone line, of an incoming call, the caller information detector 15a obtains caller information through the analog outside line interface 11 or the digital outside line interface 12.

An extension controller 16 controls the display, the function and the speech for the extension phones 2. The extension controller 16 includes a first display controller 16a and a second display controller 16b, both of which will be described below. When an incoming call is received by an extension incoming call group, the first display controller 16a turns on or turns off display lamps 24a1 to 24j1 (these correspond to the first display unit of the invention and hereinafter are referred to, for short, as display lamps 24-1) for notifying the extension phones 2 that an incoming call has arrived for the group. When this call is not answered at one of the extension phones 2 in this incoming call group, the first display controller 16a transmits a request that all the extension phones 2 in the incoming call group turn on the display lamps 24-1. Then, when from among an incoming call group a log key (hereinafter referred to as a function button 24-2) for function buttons 24a2 to 24j2 is manipulated at one, or more, of the extension phones 2 and a request is issued for the display of the contents of a group incoming call log table 17c, which will be described later, the first display controller 16a requests that the extension phones 2 in the extension incoming call group turn off the display lamps 24-1.

As is shown in FIG. 3, for the incoming call group log keys, a function for displaying the contents of the incoming call group log table 17c is correlated with a display function button at a predetermined location, e.g., a display function button 24a, one of the display function buttons 24a to 24j (hereafter referred to as function buttons 24) that are located at positions a to j on the extension phone 2. The incoming call group log keys for different extension incoming call group numbers can be allocated for a single extension phone 2, e.g., the display function button 24a can be allocated for use as an incoming call group log key for extension incoming call group number 01, and the display function button 24b can be allocated for use as an incoming call group log key for extension incoming call group number 02. Similarly, other functions can be assigned for the remaining function buttons 24.

When a request to display the contents of the group incoming call log table 17c is issued in response to the manipulation of the incoming call group log key, the second display controller 16b extracts, from the group incoming call log table 17c, the incoming call record for the extension incoming call group corresponding to the incoming call group log key, and displays the record on a display unit 27 (corresponds to a second display unit according to the invention) provided for the requesting extension phone 2.

Referring again in FIG. 1, a storage unit 17 is used to store programs and a variety of setup information that includes the outside call destination table 17a, a group incoming call table 17b, the group incoming call log table 17c (corresponds to the group incoming call record storage unit according to the first aspect of the invention), a function table 17d and an individual phone incoming call log table 17e.

These five tables, which are stored in the storage unit 17, will now be described. The outside call destination table 17a, which is a first table, is correlated with caller information received by the analog outside line interface 11, the digital outside line interface 12, or the caller information detector 15a in order to determine the destination for a call received by the outside line interface 11 or 12. Specifically, as is shown in FIGS. 4A and 4B, the outside call destination table 17a in FIG. 4A includes an outside call destination table A, which is a first outside call reception table in which destination telephone numbers are correlated with the outside line interfaces 11 and 12, and in FIG. 4B includes an outside call destination table B, which is a second outside call reception table in which destination telephone numbers are correlated with individual caller numbers.

In the outside call destination table A in FIG. 4A, number 01 (an analog outside line interface number), allocated for the analog outside line interface 11, is correlated with three extension numbers, Tel01, Tel02 and Tel03, while number 02 (a digital outside line interface number), allocated for the digital outside line interface 12, is correlated with only one extension number, Tel04. Therefore, when a call is received by the outside line interface 12, at digital outside line interface number 02, the outside call destination table A is referred to, extension number Tel04 is extracted, and the call is transferred to the extension phone 2 that corresponds to extension number 04.

In the outside call destination table B in FIG. 4B, extension incoming call group numbers 02 and 03 are correlated with caller number "123-45XX", while extension numbers Tel04 and Tel05 are correlated with caller number "922-22XX". Therefore, when caller number "123-45XX" is received by the caller information detector 15a, the outside call destination table B is referred to, group numbers 02 and 03 for the extension incoming call groups corresponding to the caller number "123-45□□" are extracted, and the call is transmitted to the extension phones 2 corresponding to group numbers 02 and 03.

When a caller number is received by the caller information detector 15a, the outside call destination table B is referred to first, and when a corresponding destination telephone number is not found in the outside call destination table B, the outside call destination table A is referred to and an extension phone 2 at an appropriate destination is selected.

The group incoming call table 17b, which is a second table held in the storage unit 17, is used to simultaneously transmit, to a plurality of extension phones 2 in the extension incoming call group, an incoming call received along a telephone line. In the group incoming call table 17b, two extension numbers, at the least, are correlated with the extension incoming call group number. This table 17b can be designated by a computer (not shown) connected to the extension phone 2 or to the private branch exchange 1. In this case, an additional interface must be provided for the computer.

As is shown in FIG. 5, for the group incoming call table 17b, two or more of the extension numbers allocated for the individual extension interfaces 13 can be entered in correlation with each group number (extension incoming call group number). For example, in FIG. 5, extension numbers Tel01, Tel02 and Tel03 are correlated with extension incoming call group number 01, and Tel03, Tel04 and Tel05 are correlated with extension incoming call group number 02.

In the group incoming call log table 17c, which is the third table in the storage unit 17, a caller number obtained by the caller information detector 15a is entered in correlation with a call reception time and an extension incoming call group number when a call for the extension incoming call group number is received and when one of the extension phones 2 in a corresponding extension incoming call group has not been used to answer this call. Specifically, as is shown in FIG. 6, the extension incoming call group number, the caller number (the incoming call log number) for the incoming call, and information as to whether the incoming call log was or was not referred to are correlated with each other and are stored in the group incoming call log table 17c.

According to an example in FIG. 6, a call for group number 01 was received from caller number "12345○○", and none of the extension phones 2 belonging to group number 01 has as yet been used to refer to this information (reference: no). Further, a call addressing group number 10 was received from caller number "331234567○□", and one of the extension phones 2 belonging to group number 10 has already been used to refer to this information (reference: yes). In the group incoming call log table 17c, not only are the incoming call group number, the caller number and reference information entered in correlation with each other, but also, although not shown in FIG. 6 but as is shown in the contents displayed for the extension phone 2 in FIG. 8, a call reception time, an answer state, an answer Tel (an answering extension telephone number), a reference Tel (a reference extension telephone number) and a reply Tel (a reply extension telephone number) are also correlated with each other. Further, the incoming call record for the extension phones 2 of the extension incoming call group is also registered in the group incoming call log table 17c.

In the function key table 17d, which is a fourth table, the display function buttons 24, which are paired sets of the display lamps 24-1 and the function buttons 24-2 in FIG. 3, are correlated with functions to be performed. The function key table 17d is allocated for the extension number of each extension phone 2, and when the function key table 17d in FIG. 7 is designated, the display function button 24a, at position a, is a key corresponding to extension incoming call group number 01, and is designated a function for displaying the contents of group number 01 in the group incoming call log table 17c. The display function button 24b, at position b, is a key corresponding to an extension incoming call group number 03, and in the extension incoming call log table 17c, is designated a function for the display of the contents for group number 03. Therefore, when a user of the extension phone 2 corresponding to extension number Tel02 depresses the display function button 24a at position a, based on the function key table 17d for extension number Tel02, the contents of group number 01 in the group incoming call log table 17c are transmitted by the private branch exchange 1 to the extension phone 2.

The individual phone incoming call log table 17e, which is the last table, is used to store an extension signal when the destination for an incoming call, received along the telephone line, is the extension number. As well as when the group incoming call log table 17c is referred to, the individual phone incoming call record display function is allocated for one of the function buttons 24-2 of the extension phone 2, and the incoming call record stored in the individual phone incoming call log table 17e can be displayed on the display unit 27, the LCD, of the extension phone 2.

Referring again in FIG. 1, a controller 18 controls the entire private branch exchange 1, and includes an incoming call group controller 18a. When the destination for an incoming call received along a telephone line is an extension incoming call group number, the incoming call group controller 18a extracts, from the group incoming call table 17b, extension numbers that are correlated with this extension incoming call group number, and transmits an incoming call signal to the extension phones 2 that correspond to the extension numbers. Further, the incoming call group controller 18a stores, in the group incoming call log table 17c, a caller number that is obtained by the caller information detector 15a upon the reception of the incoming call. In addition, when the destination of an incoming call received along the telephone line is an extension number, the incoming call group controller 18a transmits an incoming call signal to the extension phone 2 corresponding to this extension number, and stores the call in the individual phone incoming call log table 17e in correlation with the extension number.

FIG. 2 is a diagram showing the internal configuration of the extension phone 2. In FIG. 2, a communication interface 20 is used to connect the extension interface 13 of the private branch exchange 1. An audio output unit 21, such as a loudspeaker, releases an audio signal output by the private branch exchange 1, and a microphone 22 is used to enter sounds. An audio control circuit 23 performs the audio processing for the audio signal output by the private branch exchange 1 in order to output an appropriate signal to the audio output means 21, and appropriately transmits to the private branch exchange 1, through the communication interface 20, an audio signal that is entered using the microphone 22. Provided for each of the display function buttons 24 is a display lamp 24-1, which may be an LED, and a function button 24-2, for which a corresponding function is allocated. An input unit 25 is a numeric key pad used to enter information, such as a telephone number. An input detector 26 detects an entry that is made by depressing the display function button 24 or the input unit 25. The display unit 27, which may be an LCD, is used to display information that is received by the extension phone 2 from the private branch exchange 1. A hook detector 28 detects the state of a hook switch (not shown) to determine whether a handset (not shown) has been lifted from the telephone. And control for the entire extension phone 2 is provided by a controller 29.

The input detector 26 detects an entry that is made using the display function button 24 or the input unit 25, and notifies the controller 29 to this effect. And the controller 29 receives display information, through the communication interface 20, from the display controller 16a or 16b of the private branch exchange 1, and displays the contents of the display information on the display unit 27.

FIG. 3 is a diagram showing the external appearance of the extension phone 2 according to the embodiment of the invention. The structures of the display function buttons 24, the function buttons 24-2 and the display lamps 24-1 have already been described. The display function buttons 24 are positioned above the input unit 25, and each is constituted by arranging a function button 24-2 and a display lamp 24-1 adjacent to each other. Therefore, the correlation between the function buttons 24-2 and the display lamps 24-1 can be understood quickly, at a glance. The function buttons 24-2 and the display lamps 24-1 may be integrally formed, and the display lamps 24-1 may be LCDs.

FIG. 8 is a diagram showing the contents of a group incoming call log that is displayed on the display unit 27 of the extension phone 2 according to the embodiment. In this state, the display function button 24 is depressed, and based on the function key table 17*d*, the incoming call record (the contents of the group incoming call log table 17*c*) for an extension incoming call group number (e.g., group 01) corresponding to the depressed function button 24 is displayed. From the left, the call reception time, the caller number, the answering state, the answering Tel, the reference Tel and the reply Tel are displayed. The "call reception time" is the time whereat an incoming call arrived at the extension incoming call group, and the "caller number" is the telephone number of the source that placed a call to the extension incoming call group. The "answer state" refers to information indicating that the incoming call for the extension incoming call group was answered by one of the extension phones 2 belonging to the incoming call group number of the extension incoming call group. The "answer Tel" is the extension number of the extension phone 2 used to answer the call. The "reference Tel" is the extension number of the extension phone 2 that first referred to the incoming call record. And when the incoming call record has not yet been referred to by any of the extension phones 2, nothing is displayed. Instead of the extension number, information (reference information; e.g., reference: yes or no) may be displayed indicating whether or not one of the extension phones 2 in the extension incoming call group was used to refer to the record. The "reply Tel" is the extension number of the extension phone 2 used to examine the incoming call record that was displayed and from which a call was returned, using the caller number on the record, in response to the outside call. It can be understood that the user of the extension phone 2 made a return call in response to an incoming call for which, in the "answer state", the remark "no answer" was entered.

Figure 9:
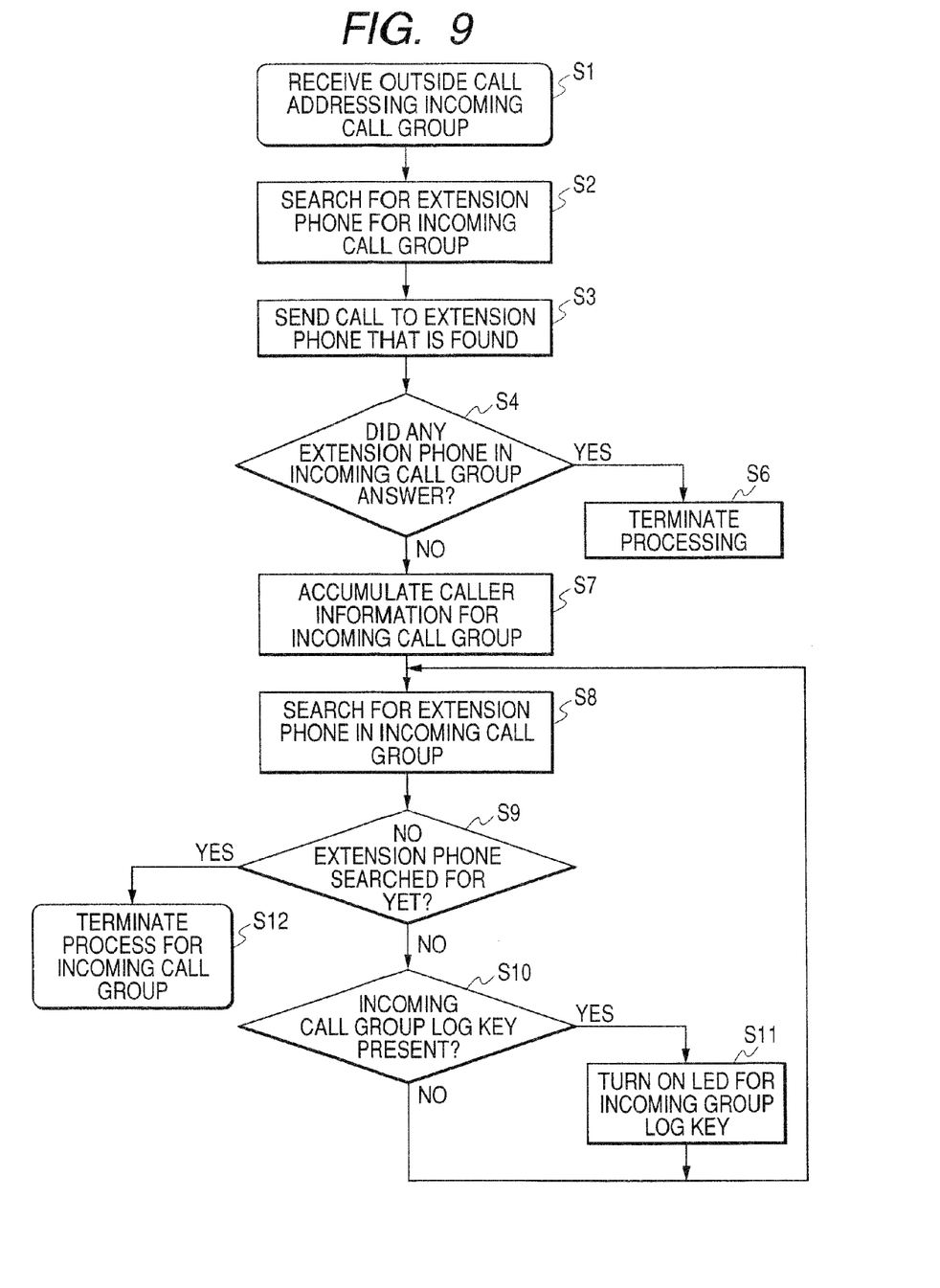
FIG. 9 is a flowchart for the operation performed to register data for the group incoming call log table of the private branch exchange according to the embodiment of the invention.
Figure 10:
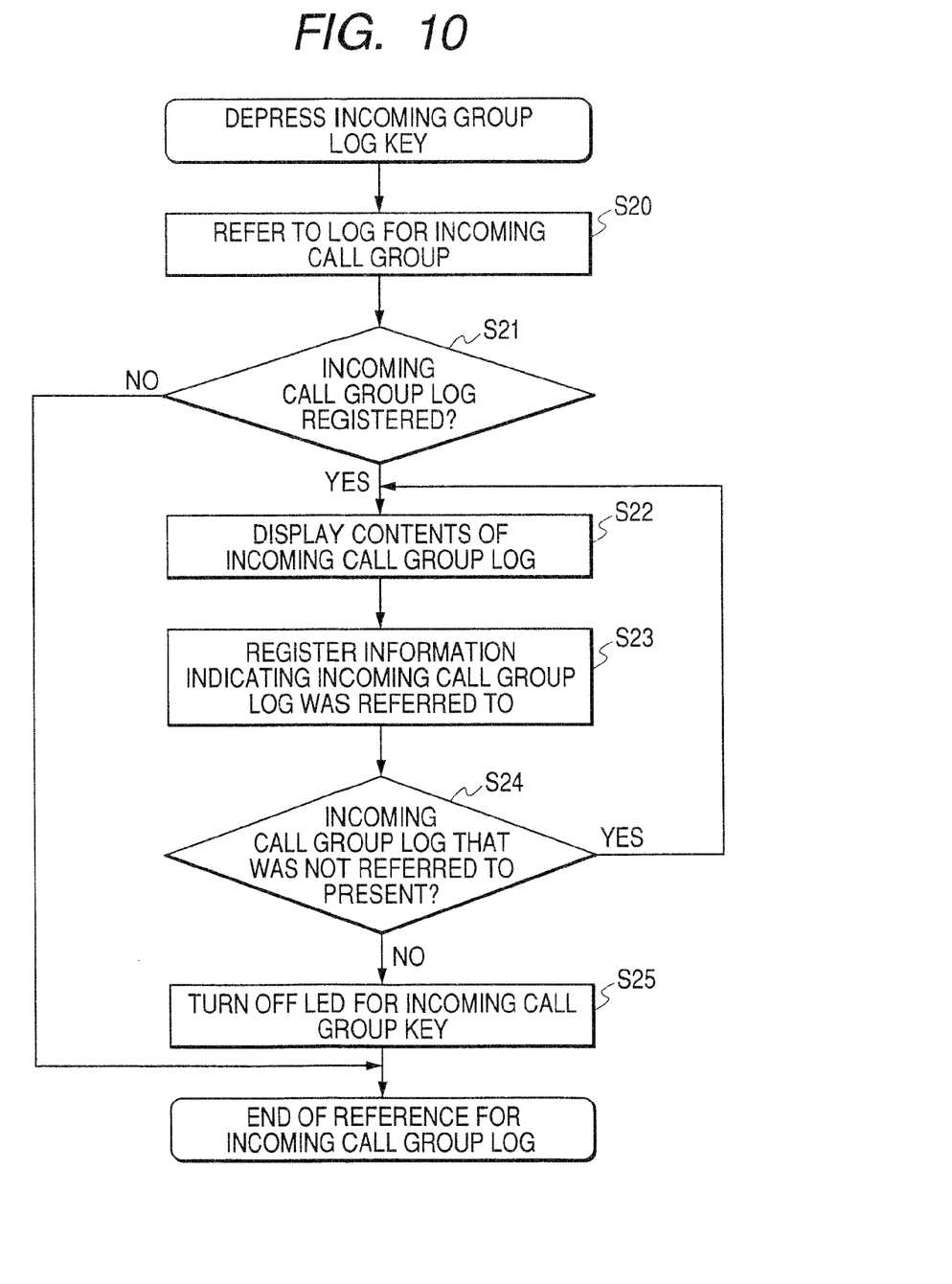
FIG. 10 is a flowchart for the operation performed for this embodiment when the extension phone connected to the private branch exchange refers to the group incoming call log table.
Figure 11:
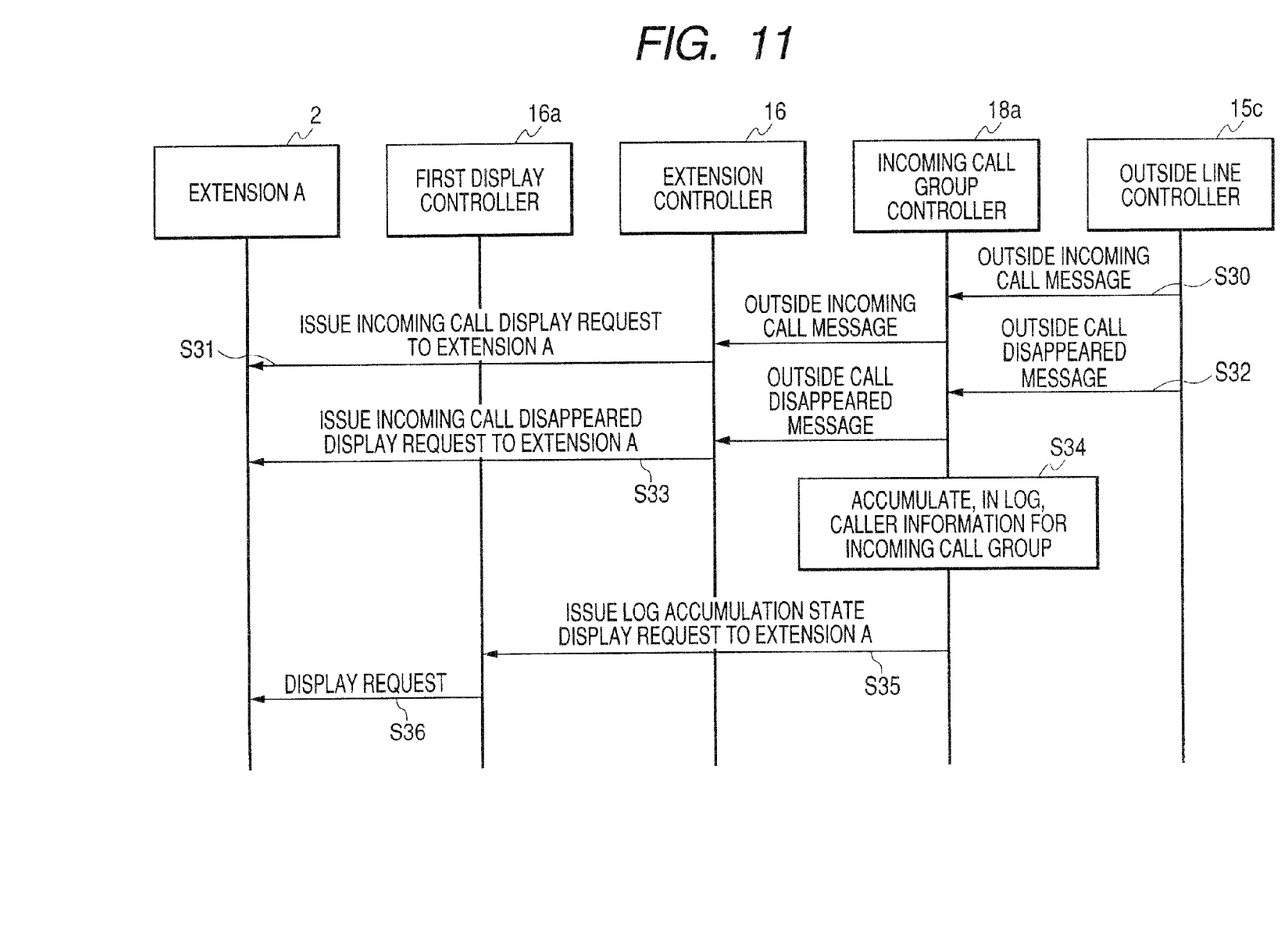
FIG. 11 is a sequence chart for the operation performed for this embodiment when the extension phone connected to the private branch exchange refers to the group incoming call log table.
Figure 12:
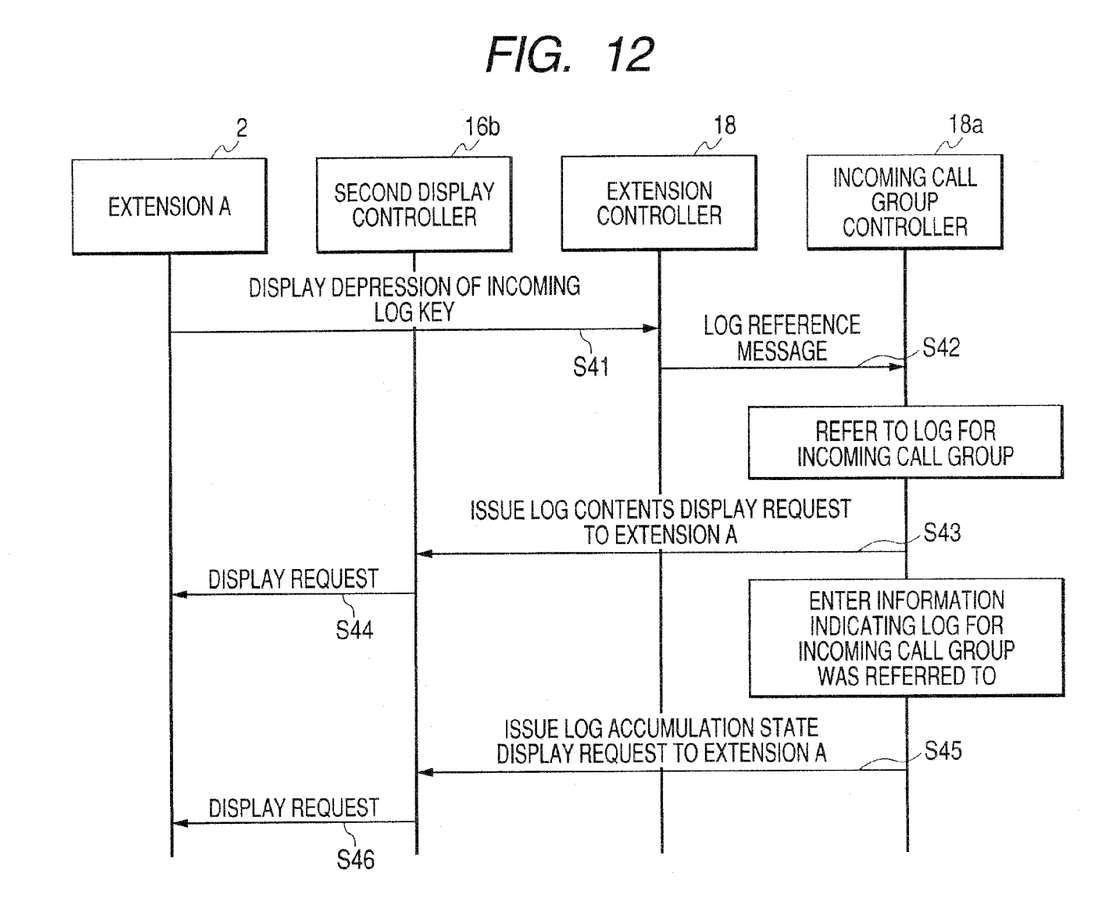
FIG. 12 is a sequence chart for the operation performed for this embodiment when the extension phone connected to the private branch exchange refers to the group incoming call log table.

The operation of the thus arranged private branch exchange 1 will now be described while referring to the flowcharts in FIGS. 9 and 10 and the sequence charts in FIGS. 11 and 12. FIG. 9 is a flowchart showing the operation performed to register, in the private branch exchange 1 in accordance with the embodiment of the invention, data contained in the group incoming call log table 17*c*. FIG. 10 is a flowchart for the operation performed for this embodiment when the extension phone 2 connected to the private branch exchange 1 refers to the group incoming call log table 17*c*. And FIGS. 11 and 12 are a sequence chart for the operation performed for this embodiment when the extension phone 2 connected to the private branch exchange 1 is used to refer to the group incoming call log table 17*c*.

First, while referring to FIG. 9, the operation performed for the register data in the group incoming call log table 17*c* of the private branch exchange 1 will be explained.

As is shown in FIG. 9, when an incoming call signal is transmitted along a telephone line to the analog outside line interface 11 or to the digital outside line interface 12, the outside line interface 11 or 12 detects the incoming call signal. Then, after the incoming call signal has been detected by the outside line interface 11 or 12, the outside line controller 15 employs the caller information detector 15*a* to determine whether, upon the arrival of the call, caller information was received along the telephone line. When it is ascertained that a caller number was received, the outside line controller 15 examines the outside call destination table B, included in the outside call destination table 17*a*, and determines whether a corresponding caller number is present. When a corresponding caller number is present, the outside line controller 15 extracts, from the outside call destination table B, either the extension number of the extension phone 2 at the destination or the extension incoming call group number. When a corresponding caller number is not available, or when caller information is not received by the caller information detector 15*a*, the outside line controller 15 extracts the extension number or the extension incoming call group number from the outside call destination table A included in the outside call destination table 17*a*. The extracted extension number, or the extension incoming call group number, is then transmitted to the controller 18, and when the number extracted from the outside call destination table 17*a* is an extension incoming call group number (S1), the incoming call group controller 18*a* examines the group incoming call table 17*b* and extracts the extension numbers for all the extension phones 2 at the call destination corresponding to the extension incoming call group number (S2). Thereafter, the incoming call group controller 18*a* transmits an incoming call signal, through the extension interfaces 13, to all the extension phones 2 corresponding to the extracted extension numbers, and notifies the extension phones 2 that a call has arrived (S3).

Thereafter, a check is performed to determine whether the incoming call signal has been answered at one of the extension phones 2 (S4). When the call has been answered at one of the extension phones 2 belonging to the extracted extension incoming call group number, the incoming call group controller 18*a* permits the switching unit 14 to control a speech path, so that the terminal connection for the telephone line and the extension phone 2 at which the incoming call was answered is established to start the speech. Then, the incoming call process is completed (S6). On the other hand, when none of the extension phones 2 belonging to the extracted extension incoming call group number has been used to answer the incoming call, and the call to the extension incoming call group is abandoned (the call is halted when the telephone at the source is on-hooked), the incoming call group controller 18*a* registers, in the group incoming call log table 17*c*, incoming call record information such as the extension incoming call group number, the call reception time and the caller number (S7).

Furthermore, the incoming call group controller 18*a* examines the group incoming call table 17*b* to find extension numbers for the extension phones 2 that belong to the extracted extension incoming call group number, and again extracts the extension numbers (S8). Thereafter, the incoming call group controller 18*a* repeats this process until there are no unprocessed extension phones 2 (S9). And based on the function key table 17*d*, the incoming call group controller 18*a* determines whether the incoming call group log key has been designated for one of the display function buttons 24 of each of the extension phones 2 corresponding to the extracted extension numbers (S10). When the incoming call group log key is so designated, the first display controller turns on the display lamp 24-1 for the function button 24 that corresponds to the extracted extension incoming call group number (S11). The processes at S9 to S11 are performed for all the extension numbers extracted at S8, and when at S9 no unprocessed extension phones 2 remain, the incoming call process for the extension incoming call group is terminated (S12).

In this explanation, the processing is terminated at S6. In this case, as at S7, the extension incoming call group number, the call reception time and the caller number may be registered in the group incoming call log table 17*c*. Furthermore, information indicating that the incoming call was answered (the "answer state" in FIG. 8) and the extension number (the "answer Tel" in FIG. 8) of the extension phone 2 at which the call was answered may also be registered.

Since the sequence chart in FIG. 11 for the operation performed when the extension phone 2 is used to refer to the group incoming call log table 17c is the same as that explained while referring FIG. 9, this sequence will be described only briefly. When a call addressing the extension incoming group is received, the outside line controller 15 notifies the incoming call group controller 18a of the extension incoming call group number (S30). Then, the incoming call group controller 18a extracts the extension numbers for all the extension phones 2 at the destination corresponding to the extension incoming call group number, transmits an outside call arrival message to the extension controllers 16 of all the extension phones 2 corresponding to the extracted extension numbers, and issues an incoming call display request to an extension phone 2a (extension A) through the extension interface 13 (S31).

When the call is not answered at any of the extension phones 2, and when the call is abandoned, the outside line controller 15 transmits an outside call disappeared message through the incoming call group controller 18a for transmission to the extension controller 16 (S32). Then, the outside line controller 15 issues an incoming call disappeared display request to the extension phone 2a (extension A) through the extension interface 13 (S33). Upon the reception of the outside call disappeared message, the incoming call group controller 18a accumulates the caller information in the group incoming call log table 17c (S34) and issues a request to the extension phone 2a (extension A) for the display of the log accumulation state of the group incoming call log table 17c (S35). Then, the first display controller 16a transmits a display request to the display lamp 24-1 (S36).

Thereafter, since the information that there is an incoming call, for the extension incoming call group, that has not yet been answered can be displayed by using the display lamp 24-1, the presence of a call that has not yet been answered can be ascertained at a glance.

The operation performed when the extension phone 2 connected to the private branch exchange 1 refers to the group incoming call log table 17c will be specifically described while referring to FIG. 10.

When the function button 24-2 of the extension phone 2 is depressed, the input detector 26 of the extension phone 2 detects this depression, and based on this detection, the controller 29 of the extension phone 2 transmits the depression information through the communication interface 20 to the private branch exchange 1. Upon receiving the depression information, the controller 18 of the private branch exchange 1 examines the function key table 17d to determine the function designated for the function button 24-2 that has been depressed. When the designated function is the incoming call group log key, the incoming call record, such as the call reception time, the caller information and the reference information, for the extension incoming group number that corresponds to the incoming call group log key is extracted from the group incoming call log table 17c (S20). Then, a check is performed to determine whether there is incoming call record information that has not yet been displayed on the display unit 27 of the extension phone 2, i.e., that has not yet been referred to (S21).

When it is determined that such incoming call record information is present, the second display controller 16b extracts one set of the incoming call record information that has not yet been referred to, and transmits the extracted information to the extension phone 2 for which the incoming call group log key was depressed, so that this information can be displayed on the display unit 27 of the extension phone 2. Upon receiving the incoming call record information, the controller 29 of the extension phone 2 displays the received information on the display unit 27 (S22). Then, for the incoming call record information displayed on the display unit 27 of the extension phone 2, correlated information indicating that the pertinent record was referred to is registered in the group incoming call log table 17c (S23).

A check is then performed to determine whether incoming call record information that has not yet been referred to is still present in the group incoming call log table 17c (S24). When it is determined that such incoming call record information is still present, the processes at S22 to S24 are repeated until there is no more incoming call record information that has not been referred to. When it is determined at S24 that there is no more incoming call record that has not yet been referred to and that should be displayed on the display unit 27 of the extension phone 2, the first display controller 16a transmits a request to all the extension phones 2 for which function buttons 24-2 are allocated to turn off the display lamps 24-1 for the incoming call group log keys (must correspond to the extension incoming call group number). Upon receiving this request, the controllers 29 of the extension phones 2 turn off the display lamps 24-1 (S25). Thereafter, the operation for the display, on the extension phone 2, of the incoming call record information stored in the group incoming call log table 17 is terminated.

Assume that the group incoming call log table 17c is set in FIG. 6, and the function key table 17d is set in FIG. 7. When the function button 24a1 of the key number of the extension phone 2 corresponding to extension number Tel02 is depressed, the input detector 26 detects that the function button 24a1 has been depressed, and the controller 29 transmits the depression information through the communication interface 20 to the private branch exchange 1. Upon receiving the depression information, the controller 18 of the private branch exchange 1 examines the function key table 17d to determine what function is to be executed for the function button 24a1 that has been depressed.

Since according to the function key table 17d, the function button 24a for extension number Tel02 is the group log key for "incoming call group 01", the incoming call record (e.g., the call reception time) concerning caller number "12345XX" that has not yet been referred to is extracted from the incoming call record for "incoming call group 01" in the group incoming call log table 17c. This incoming call record concerning "12345XX" is displayed on the display unit 27 of the extension phone 2 corresponding to extension number 02. Since there is no more incoming call record information that has not yet been referred to, the extraction of the incoming call record information is terminated. Then, a request is issued to all the extension phones 2 that belong to the "incoming call group 01", and for which the group log key for "incoming call group 01" has been registered, to turn off the display lamp 24-1 corresponding to the group log key for "incoming call group 01". Upon receiving this request, the extension phones 2 turn off the display lamps 24-1.

As is described above, since the incoming call group key is allocated for one of the display function buttons 24 of the extension phone 2, by depressing this key, information can be obtained concerning an incoming call for the extension incoming call group that was not answered using any of the extension phones 2 that are correlated with the extension incoming call group number corresponding to the incoming call group key. On the other hand, when calls for an extension group arrive frequently, and when both records that have not been referred to and records that have already been referred are displayed, the amount of incoming call record information is increased and is not easy to view. However, in this embodiment, the incoming call record information that has already been referred to is not displayed, so that the difficulty encountered in examining information on the display can be eliminated. At S22 to S24, the incoming call record information for incoming calls that have not been answered and have not been referred to is displayed on the extension phone 2. However, when calls for the extension group do not arrive frequently, or as needed, only the various information described above while referring to FIG. 8 need be displayed. This is very convenient because detailed information can be obtained for incoming calls for the extension incoming call group, and a variety of situations can be coped with.

Since the sequence in FIG. 12 is the same as that explained while referring to FIG. 10, only a brief explanation for it will be given. When the incoming call group log key for the extension phone 2 (extension A) is depressed, the depression information is transmitted through the communication interface 20 to the extension controller 16 of the private branch exchange 1 (S41). Furthermore, based on the function key table 17d, a log reference message is transmitted to the incoming call group controller 18a (S42). The incoming call group controller 18a examines the group incoming call log table 17c and transmits a request to the second display controller 16b to display the contents of the group incoming call log table 17c (S43). Further, the second display controller 16b transmits a display request to the display unit 27 of the extension phone 2 (S44).

When the log content display request is issued at S43, the incoming call group controller 18a enters in the group incoming call log table 17c information indicating the log was referred to, and thereafter, upon the reception of each log reference message, transmits a request for the display of the log accumulation state for the group incoming call log table 17c (S45). Subsequently, the second display controller 16b issues a display request to the display unit 27.

As is described above, by depressing the incoming call group log key, information can be obtained for a call for the extension incoming call group that was not answered using any of the extension phones 2 correlated with the extension incoming call group number corresponding to the incoming call group log key. Further, ordinarily, the incoming call records, both those that have already been referred to and those that have not yet been referred to, are displayed together, and the amount of incoming call record information is increased and viewing it is not easy. On the other hand, since in this embodiment incoming call record information that has already been referred to is not displayed, the difficulty encountered in examining the information on the display can be avoided.

According to the present invention, a private branch exchange can be provided that comprises: a caller information detector for, when a call has arrived along a telephone line, receiving caller information along the telephone line; a group incoming call table in which two extension numbers, at the least, are correlated with extension incoming call group numbers; and a controller for, when a call received along the telephone line is for an extension incoming call group number, extracting from the group incoming call table extension numbers that are correlated with the extension incoming call group number and transmitting an incoming call signal to extension phones that correspond to the extension numbers, and for transmitting to extension phones an incoming call signal corresponding to the extension numbers, while storing in a group incoming call log storage unit, a caller number that is obtained by the caller information detector. With this arrangement, an incoming call record for the extension group can be identified.

Since the incoming call log can be stored for the incoming call extension group, the log for incoming calls for the extension group can be identified, and the log will be easy to use.

Assuming that calls are frequently received by the extension group, and that the incoming calls already answered by the extension phones in the extension incoming call group are also registered in the incoming call log, the amount of incoming call log information would be increased and could not easily be examined on a display. However, since only incoming calls that have not yet been answered at any of the extension phones in the extension incoming call group are registered in the incoming call log, the provision that the log of incoming calls will be difficult to view can be avoided. It should be noted that the setup can be performed in consonance with the existing situation. That is, an extension phone or a computer connected to the private branch exchange can be manipulated to designate, in the setup information table (not shown) of the storage unit, whether only incoming calls that have not yet been answered are to be registered in the log, or whether incoming calls that have been answered are also to be registered. Then, operation of the controller of the private branch exchange can be performed in consonance with the setup contents.

Since not only the incoming call log for the incoming call extension group can be stored, but also the incoming call log for each extension phone can be stored, the log of incoming calls for each of the extension phones and the log for incoming calls for the extension group can be identified.

Since a call received along the telephone line at the outside line interface can be transmitted to the extension incoming call group, outside calls can also be included in the log of the incoming calls for an extension group.

Since information indicating that there is an incoming call for the extension incoming group that has not yet been answered can be displayed on the display units, the presence of an incoming call that has not yet been answered can be identified, without the incoming call log being extracted from the group incoming call log storage unit and displayed on the display units of the extension phones.

Upon the reception of the incoming call log display request, the incoming time and the caller number can be extracted and the incoming call log can be displayed on the display unit of the extension phone.

When information indicating the presence of an incoming call, for an extension incoming call group, that has not yet been answered is displayed on the display unit, a user who desires to refer to the group incoming call log need only depress a predetermined button to transmit the incoming call log display request to the private branch exchange. Then, the first display controller can extract the incoming call log from the group incoming call log storage unit and present the log on the display unit of the extension phone, and can cancel the no answer message. This arrangement is especially effective in the following case. When one of the users belonging to the extension incoming call group decides to examine the log for incoming calls that have not yet been answered, e.g., when the first user ascertains there is an incoming call that has not yet been answered and deals with this call, by calling back, for example, the incoming call log need not immediately be displayed for the other users.

With an arrangement according to which information that the caller number has already been referred to is stored in the incoming call log storage unit, when only the log for incoming calls that have not yet been answered are to be displayed on the display unit of the extension phone, the controller of the private branch exchange can extract, from the incoming call log storage unit, the log for incoming calls that have not yet been referred to, and can also display the log on the display unit of the extension phone. Furthermore, when both the incoming calls that have already been answered and the incoming calls that have not yet been answered are to be displayed on the display unit of the extension phone, information to this effect can be presented on the display unit, so that an incoming call log that can easily be viewed can be provided for the user of the extension phone. Further, the next process performed, depending on whether the incoming call has already been referred to or not, can be easily determined.

When the first person who examined the log for unanswered incoming calls deals with these calls, e.g., by calling back, the individual who first referred to the incoming call log can be identified, and it is easy to assign responsibility for any action that has been taken.

It is extremely convenient because, when calls for the extension group arrive infrequently, or when in other cases an action is required, incoming calls for the extension incoming call group can be readily identified, and a variety of situations can be appropriately handled.

CROSS REFERENCE TO RELATED APPLICATION

This application is based upon and claims the benefit of priority of Japanese Patent Application No 2003-069994 filed on Mar. 3, 1914 the contents of which are incorporated herein by reference in its entirety.

What is claimed is:

1. A method for controlling a private branch exchange system including a private branch exchange and a plurality of extension phones, the private branch exchange receiving caller information through a communication line and storing the caller information as an incoming call log therein, the plurality of the extension phones being divided into a plurality of groups and the extension phones in a same group having a same incoming call group number, the method including the following steps of:
   when the private branch exchange receives a call for the incoming call group number through the communication line, transmitting an incoming call signal of the call to all of the extension phones in the group corresponding to the incoming call group number by the private branch exchange;
   if none of the extension phones in the group corresponding to the incoming call group number have answered the call, causing all of the extension phones to display no answer message thereon; and
   when the private branch exchange receives an incoming call log display request from at least one of the extension phones in the group corresponding to the incoming call group number, causing the at least one of the extension phones in the group corresponding to the incoming call group number to display the caller information received by the private branch exchange thereon through the communication line.

2. The method for controlling a private branch exchange system according to claim 1, wherein the method further includes, after displaying the caller information, a step of canceling the display of the no answer message on the each display of all of the extension phones in the group corresponding to the incoming call group number.

3. The method for controlling a private branch exchange system according to claim 1, wherein the caller information includes an incoming time and a caller number on the call.

4. A private branch exchange system which has plurality of extension phones and manages connections for the plurality of extension phones, the private branch exchange comprising:
   a caller information detector configured to, when a call is received through a communication line, obtain caller information;
   a group incoming call log storage unit in which the caller information is correlated with an extension incoming call group number;
   a group incoming call table in which at least two extension numbers are correlated with the extension incoming call group number,
   a first display controller configured to control to display a no answer indication on a first display unit of each of the extension phones corresponding to the extension numbers correlated with the extension incoming call group number, and
   a controller configured to, when the call received through the communication line corresponds to the extension incoming call group number, extract the extension numbers correlated with the extension incoming call group number from the group incoming call table, transmit the call to the extension phones corresponding to the extension numbers correlated with the extension incoming call group number, and store the caller information of the call in group incoming call log storage unit, wherein:
   the first display controller controls to display the no answer indication on the first display unit of each of the extension phones corresponding to the extension numbers correlated with the extension incoming call group number, when none of the extension phones corresponding to the extension numbers correlated with the extension incoming call group number answers to the call.

5. The private branch exchange according to claim 4 further comprising:
   a second display controller configured to control to display an indication of the caller information on a second display unit of each of the extension phones corresponding to the extension numbers correlated with the extension incoming call group number, wherein:
   when an incoming call log display request is received from one of the plurality of extension phones corresponding to the extension numbers correlated with the extension incoming call group number, the second display controller extracts the caller information from the group incoming call log storage unit and controls to display the caller information on the second display unit of the one of the extension phones.

6. The private branch exchange according to claim 4, wherein based on the indication of the caner information, the first display controller cancels the display of the no answer Indication.

* * * * *